Figure 1:
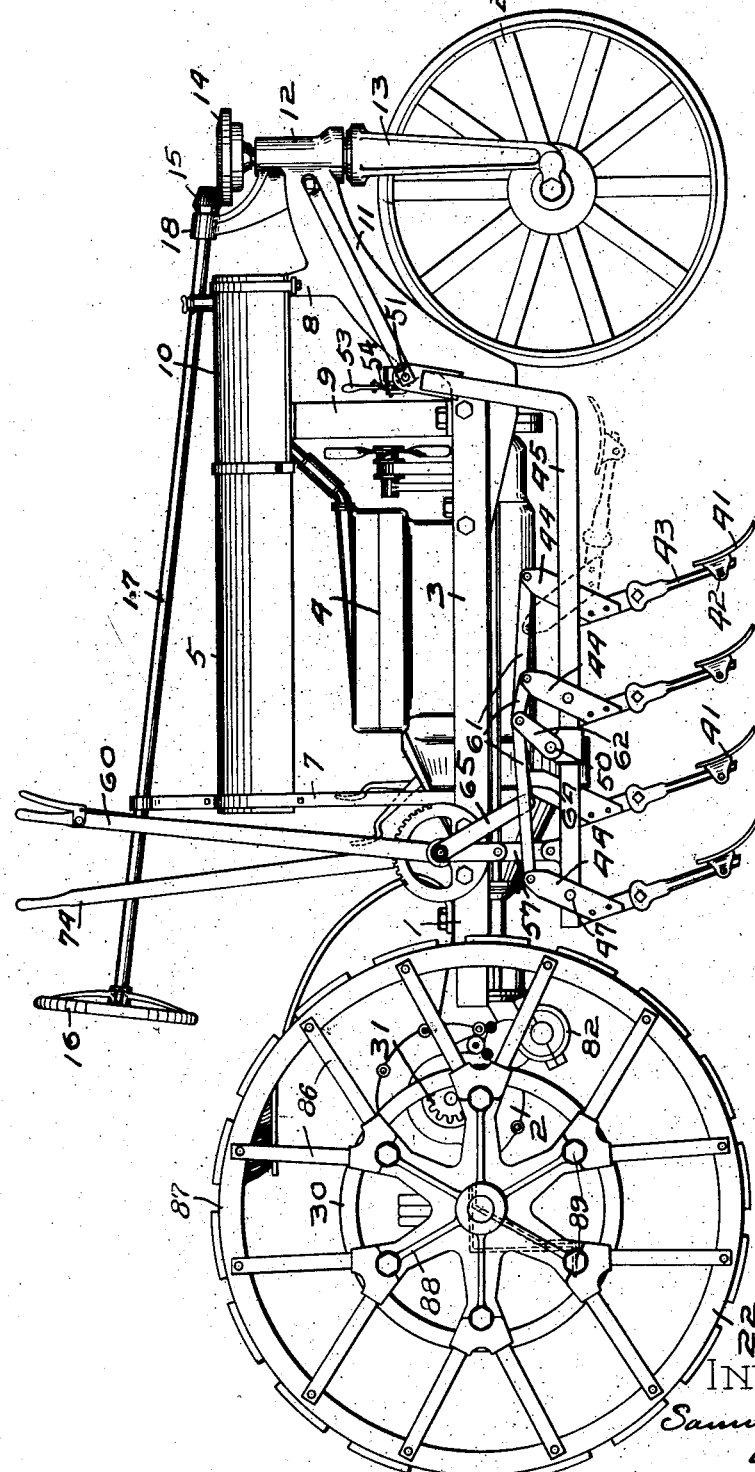

March 17, 1925.

S. W. RAYMOND

TRACTOR

Filed Nov. 25, 1921

1,530,409

4 Sheets-Sheet 1

INVENTOR
Samuel W. Raymond
by
Owen, Owen & Crampton

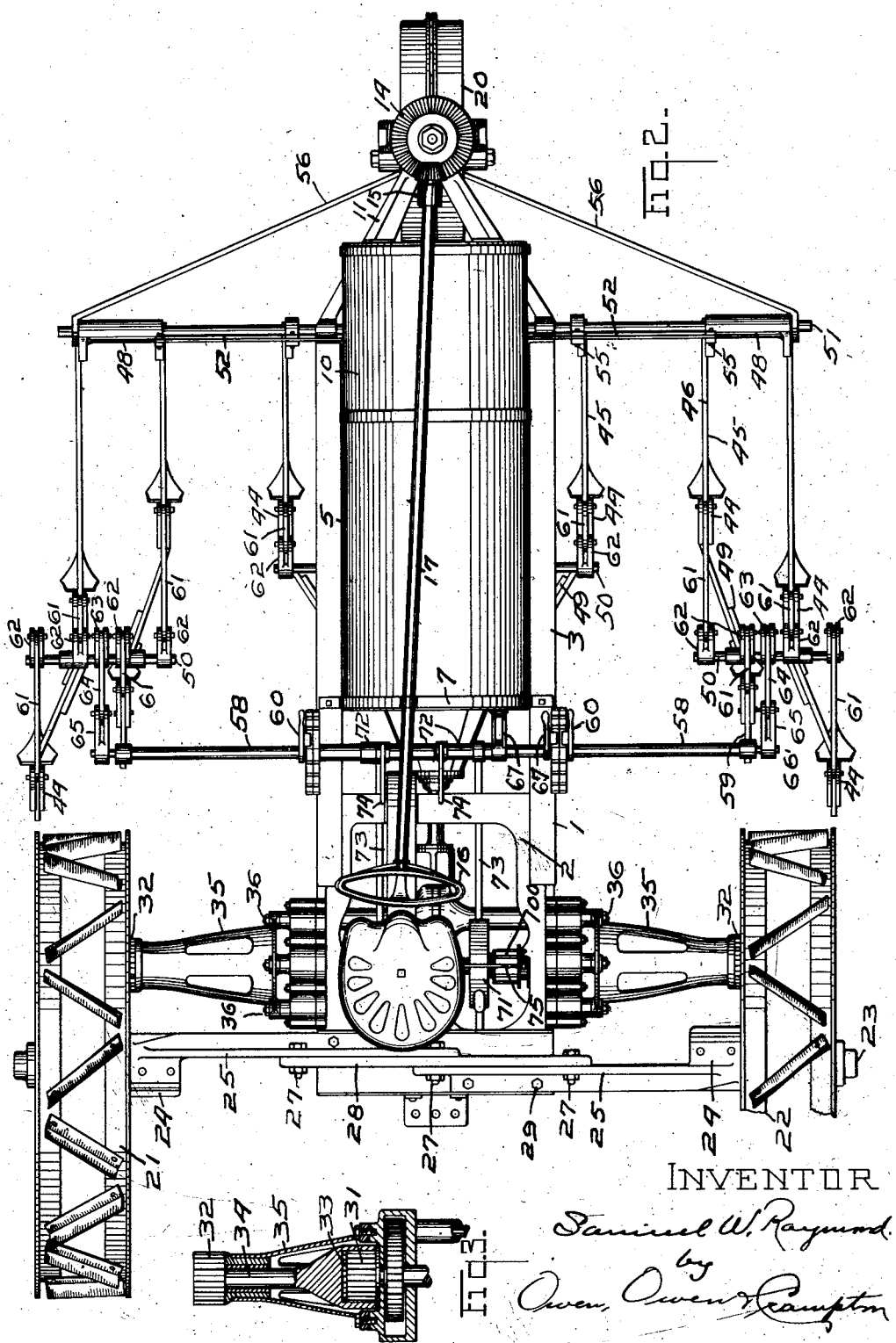

March 17, 1925.
S. W. RAYMOND
TRACTOR
Filed Nov. 25, 1921
1,530,409
4 Sheets-Sheet 3
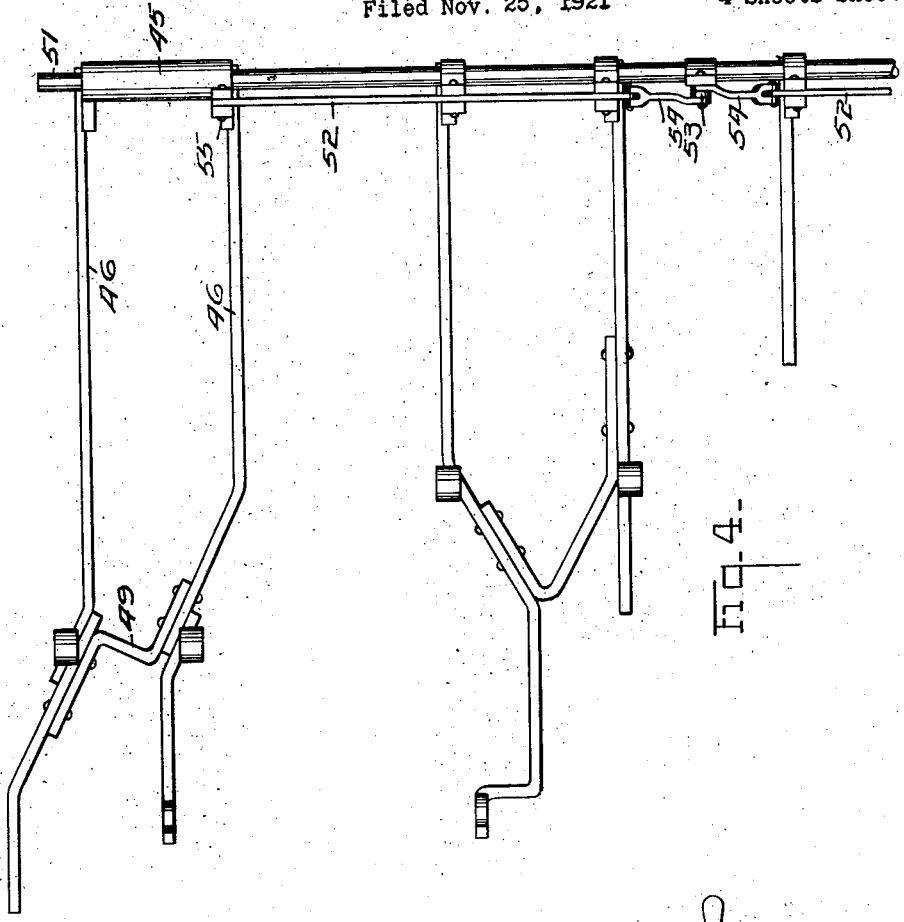
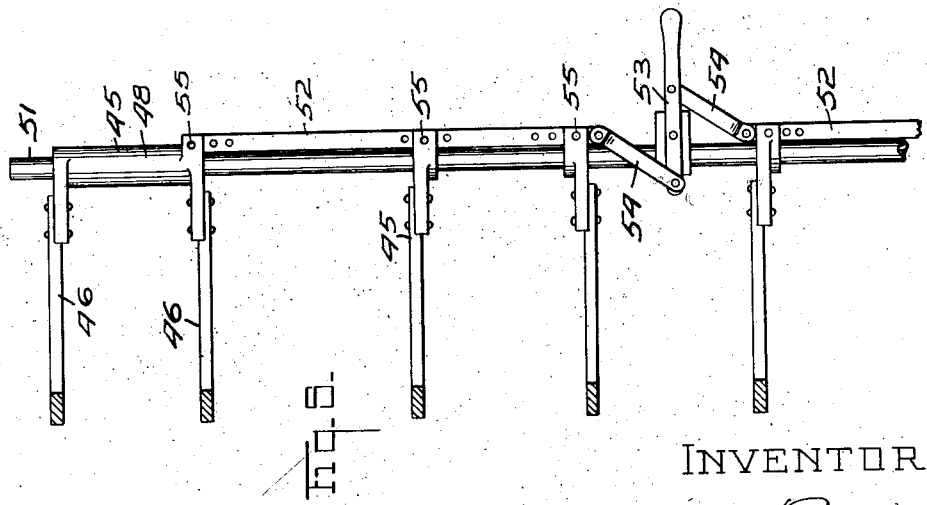
INVENTOR
Samuel W. Raymond.
by
Owen, Owen & Crampton.

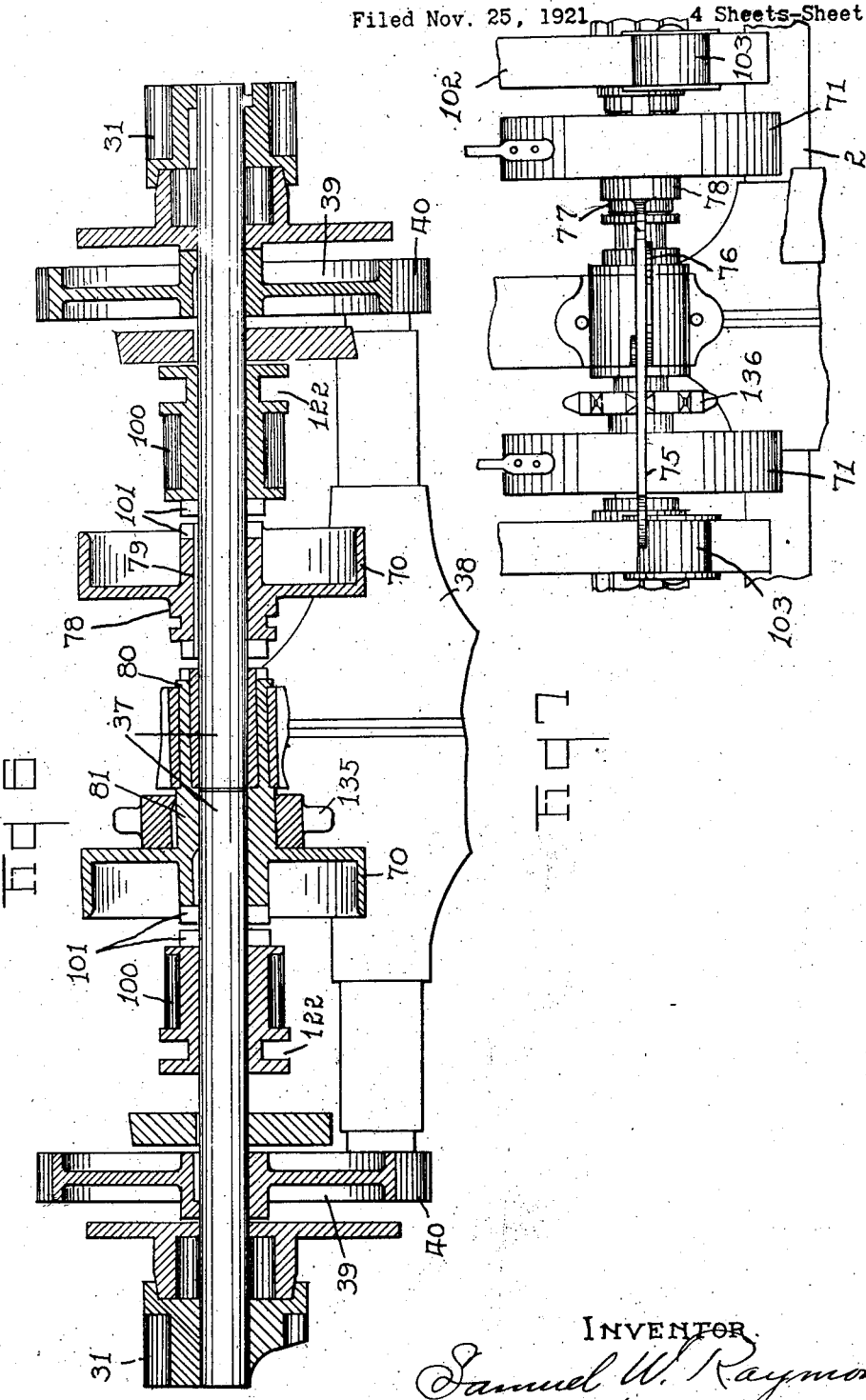

Patented Mar. 17, 1925.

1,530,409

UNITED STATES PATENT OFFICE.

SAMUEL W. RAYMOND, OF ADRIAN, MICHIGAN.

TRACTOR.

Application filed November 25, 1921. Serial No. 517,479.

*To all whom it may concern:*

Be it known that I, SAMUEL W. RAYMOND, a citizen of the United States, and a resident of Adrian, in the county of Lenawee and State of Michigan, have made an invention appertaining to a Tractor; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a tractor that is so constructed that it may be readily modified to efficiently perform all kinds of farm work to the extent that horses used for farm work may be dispensed with. It is so geared that it may be operated to receive the well known Ford engine or any engine of equivalent or greater power. The invention particularly has for its object to provide a tractor that can be readily changed into a cultivator tractor and to a general purpose of hauling tractor and to a plow tractor. It provides a tractor that is particularly adapted to agricultural purposes in that it provides adjustments and attachments for readily connecting implements of different kinds to the tractor.

The invention also provides means for manipulating the agricultural implements of different kinds, and which will coact with the means for manipulating the tractor to produce the most efficient results. The invention also provides means for connecting the agricultural implements to the tractor in such a position that the operation of the agricultural implements may be readily observed by the driver both as to their action on the soil and the path or paths of their operation through the soil in order that the tractor and the agricultural implements may be readily manipulated by the driver to obtain the best results. The invention also consists in other features and advantages that will appear from the following description and upon examination of the drawings.

Structures containing the features of my invention may partake of different forms. To illustrate a practical application of the invention I have selected a tractor as examples of the structures containing my invention and shall describe it hereinafter. The structures selected as examples are illustrated in the accompanying drawings.

Figure 1 illustrates a side view of the tractor when used as a cultivator tractor. Fig. 2 is a top view of the tractor shown in Fig. 1. Fig. 3 is a sectional view of an extension shaft housing. Fig. 4 is a top view of cultivator frames. Fig. 5 is a side view showing a means for adjusting the frames. Fig. 6 is a sectional view of the jack shaft. Fig. 7 is a top view of the jack shaft supporting parts.

In Figure 1 is shown the tractor modified from general service into a cultivator tractor. The tractor is provided with a tractor frame 1 formed of two parts. 2 is a casting for supporting the main driving gearing of the tractor, and 3 is a part for supporting the forward end of the tractor. The frame 2 is a solid casting having the necessary bosses and ridges cast integral therewith for securing the parts of the driving mechanism, as hereinafter described. The part 3 extends forward and supports the engine 4 and its parts. The engine 4 is connected to the part 3 of the frame 1 in any suitable way and the gasoline tank 5 is supported in suitable brackets, such as the brackets 7 and 8 above the engine. Also a radiator 9 is supported on the frame. The radiator 9 may be connected to a water tank 10 located above the radiator. The tanks 5 and 10 may be formed integral, that is, the side walls may be made integral and the chambers therein formed by a separating or partitioning wall. The engine 4 is provided with the usual pedals and power regulating and controlling means in the manner well known in the art.

The frame 1 is also provided with an extension 11 extending in arcuate form to a point above the frame 1. The extension 11 is provided with a bearing 12 in which is supported, for rotative movements, the castor frame 13. A bevel gear wheel 14 is connected to the castor frame 3 and the castor frame is turned by the bevelled pinion 15 which may be operated by the steering wheel 16 to which it is connected by the steering rod 17. The steering wheel 16 and the rod 17 are supported in the bracket 7 and in a bracket arm 18 formed integral with the extension frame 11.

The castor wheel 20 is pivoted in the Y formed by the castor frame 13 and is located on an axle positioned behind the axis of rotation of the castor frame. By this arrangement the axis of the castor wheel 20 will follow behind the axis of the castor frame, so that if the forward end of the tractor is swung in either direction the castor wheel 20 will swing about the axis of the castor frame. The tractor may be steered by turning the castor frame to force the leading end of the tractor in either direction, that is, to the right or to the left, as in turning.

The tractor is provided with the bull wheels 21 and 22 which may be of any suitable form. In the form of construction shown the bull wheels are provided with a plurality of pairs of straps 86 that are connected to the rim 87 of each of the bull wheels and to the gear wheels 30, commonly used for driving bull wheels of tractors. The straps 86 are formed of strap iron and are bolted to the rim 87 and secured in the ends of the spokes 88 that extend from the gear wheel 30 to the axle of the bull wheel. The spokes 88 thus form a spider that extends from the gear wheel 30 to the axle of the bull wheel. The gear wheel 30 is bolted to the spider by means of the bolts 89. The spider 88 is a casting, and if desired the ends of the straps 86 may be secured in the ends of the spokes 88 when the casting is made. The straps 86 being formed of strap iron, have considerable elasticity that cushions the bull wheel and elastically sustains the strain in driving the bull wheel. In order that the strains may be the better sustained the straps are arranged in pairs, each pair forming a V and the ends of the straps are secured in the ends of the spokes of the spider at the apex of the V. They are thus located at an angle to the radii extending from the center of the bull wheel. The bull wheels 21 and 22 are supported on stub axles 23 that are secured in boxings 24. The boxings 24 may be located on the ends of the slide bars 25. The slide bars 25 and 26 are formed of angle irons and are secured by means of bolts 27 to the flange 28 that is cast integral with the part 2 of the frame 1 and by the bolts 29 that extend through the rear end of the body portion of the part 2 of the frame. The slide bars 25 may be placed in any desired position with reference to the ridge 28 and the casting 2 in order to place the bull wheels in any desired distance apart according to the work that is to be done by the tractor, particularly according to the character of the agricultural implements to be used and according to the width over which those implements are to be operated or according to the distance that the bull wheels are to be placed apart in order to perform the most efficient operations in connection with any given work, such as to so place the bull wheels that they may extend over any number of rows of vegetation which is to be tilled or cultivated. When, therefore, the tractor is used for general utility, the bull wheels may be placed close together, that is, in close proximity to the frame 1. When, however, it is to be used as for cultivating purposes the bull wheels may be located in a position such that they will extend over and operate between the rows of vegetation.

When the tractor is to be used for any particular purpose, such for example, as cultivating, the bull wheels may be positioned as heretofore explained and connection made with the driving gear of the tractor. Each of the bull wheels is provided with internal gears 30 of the usual form, and the pinion 31 will mesh with the gear wheels 30 when the bull wheels are located in their general utility position. When, however, the bull wheels are separated by extending the slide bars, connection may be made between the pinions 31 and the internal gear wheels 30 by means of the pinions 32. The internal gear sleeve 33 fits the teeth of the primary pinion 31 and is connected to the secondary pinion 32 by means of the auxiliary shaft 34. The auxiliary shaft 34 is suported in the housing 35 which has a suitable bearing for the auxiliary shaft 34. The housing 35 is rigidly attached to the casting frame by means of the bolts 36. In this way each of the bull wheels is driven by means of the two-part jack-shaft 37 whether the internal gears 30 mesh with the pinion 31 or mesh with the auxiliary pinions 32. The bull wheels may thus be located in different positions relative to the frame 1 by the use of housings 35 and auxiliary shafts 34 of different lengths.

The two-part jack-shaft 37 is of a form well known in the art, the parts 37 being differentially connected through the differential contained in the differential housing 38. The connection is made through the gear wheels 39 which are keyed to the parts of the jack-shaft 37 and the pinions 40 which are connected to the differential. In the particular tractor shown in the drawing for purposes of illustration, the ordinary Ford engine is used for driving the tractor and the differential 38 is the typical well known Ford differential which connects the engine with the jack-shaft 37. Thus my invention provides a general utility tractor that may be modified to be used for any purpose, such as for cultivating, plowing or hauling, and yet may be operated by the mechanism found in the well known Ford car, the parts being so geared that the tractor will perform any and all kinds of work usually met with on farms at substantially the same rate that the different kinds of work will be performed by a three or four horse team. Thus I have produced a tractor that will meet the conditions existing on farms and the work will be performed at the rate of speed that the farmer is accustomed to in performing his work and handling the products of his farm.

When the tractor is to be used as a cultivator and the bull wheels have been adjustably positioned in the proper relation with respect to the rows of vegetation that is to be cultivated and so that the bull wheels will extend over a certain number of rows and run between certain rows, the cultivator shovels will also be positioned in certain positions according to the vegetation to be tilled and will be positioned relative to the tractor according to the depth to which the shovels are to operate. As shown in Figs. 1 and 2 the cultivator shovels 41 are adjustably secured by means of bolts 42 or other suitable means to shanks 43 that are secured to arms 44. The arms are pivotally connected to frames 45 by means of the pivot pins 47. The arms 44 extend on opposite sides of bars that form parts of the frames 45. The arms 44 extend at an angle to the shanks 43 and the shanks 43, when they are in their lowermost position, they abut against the lower edges of the bars 46 forming parts of the frame 45 as shown in Fig. 1 whereby when the shovels are working in the ground the pressure will be brought directly against the bars 46 of the frames 45. The depth to which the shovels will penetrate the ground may be generally adjusted by the position that the shovels 41 are secured on the shanks 43. Moreover, they may be adjusted by a means for positioning the frames 45 relative to the ground.

The frames 45 are formed of the bars 46, the sleeves 48 to which the bars are connected, the angular bars 49 and the rotatable bars 50. The angular bars 49 connect the longitudinal bars 46 at their following ends, and the rotatable bars 50 form means for moving the cultivator shovels about the pivot pins 47. The sleeves 48 are located on a transverse bar 51 and so as to be slidable along the bar 51. The sleeves 48 are connected together by means of rods 52. The rods 52 are connected to the lever 53 by means of the links 54. The frames may be adjustably connected to the bars 52 by means of the pins 55, the bars 52 being provided with a plurality of holes. In this way the frames and the shovels of the cultivator may be adjusted according to the proximity that they are to operate with respect to the rows of vegetation. The frames on each side of the center line of the tractor, however, may be adjusted relative to each other and to the center line of the tractor according to the distance between the rows of vegetation by swinging the lever 53 either to the right or to the left. The frames are thus drawn by the bar 51 to which they are connected. The draw bar 51 is secured to the part 11 of the frame of the tractor and it may be braced by the braces 56 which are connected to the ends of the draw bar 51 and to the leading end of the part 11 of the tractor frame.

The following ends of the frames are connected by the links 57 to the sleeves 58 through the arms 59. A lever 60 is connected to each of the links 57. Two of the frames located on each side of a row are thus connected to each of the sleeves 58 and consequently the position of the frames relative to the ground and on each side of the two rows is regulated by one or the other of the levers 60 to raise and lower the frames and consequently to raise and lower the shovels. Thus when one row is slightly raised above the other row, as when operating on a knoll or a side of a hill, the lever being located in a handy position with reference to the driver of the tractor, the cultivator shovels on each side of one or the other rows may be readily manipulated so as to readily adjust the shovels with respect to the relative height of the rows, and thus to maintain the shovels at the proper depth notwithstanding any unevenness of the ground.

In addition to the means for lifting the frames on opposite sides of the rows of vegetation I have also provided a means for lifting all of the shovels at the same time. This means may be utilized for adjusting the shovels with reference to the ground, but I find it preferable to use the said means for lifting the shovels clear of the ground. By this arrangement the cultivator shovels are raised ten or twelve inches above the ground. This is of particular advantage when the cultivator is being turned at the end of the rows, and it is also of advantage when it is being driven to or from the field or when any of the rows have been finished.

The pivoted arms 44 are connected to the links 61 which are connected to the arms 62 located on the shafts 50 pivotally supported in the frames 45. Arms 63 are keyed to the rotatable shafts 50 and are connected by means of the links 64 to the arms 65 that are keyed to the shaft 66 on which the sleeves 58 are located and by which they are supported. A lever 67 is connected to the shaft 66 whereby the shaft 66 may be rotated through a part of a circle to cause angular movements of the arms connected to the rotatable shafts 50 and corresponding angular movements of the shanks of the shovels and to cause the shovels 41 to be lifted clear of the ground. Suitable dogs and ratchets may be provided for securing the levers 60 and 67 in their positions, whereby the frames will be held in their adjusted positions and the shovels may be held in their raised positions. When, therefore, it is desired to raise the shovels relative to the frames this may be done by operating the lever 67, and unless one or more of the levers 60 has been operated to change the position of the frames, the shovels will take their same relative positions when the lever 67 is operated to lower the shovels, that is, the frames may be adjusted so as to adjust the position of the shovels and the lever 67 may be operated to raise and lower the shovels from the ground without changing the positions of the frames, which will cause the shovels to take the same positions relative to the ground.

The invention also provides means whereby the tractor may be readily turned on one of the bull wheels. The bull wheel on which the turn is made will thus return on the track that it made before the turn at the end of the rows was made. The two-part jack-shaft 37 is provided with a pair of brake or friction wheels 70 that are keyed to the parts of the jack shaft. A friction belt or brake band 71 surrounds each of the friction wheels 70. The friction brake bands 71 are connected to the sleeves 72 by means of the rods 73 in the manner well known in the art. The levers 74 are connected to the sleeves 72 to draw the rods 73 and thus to close the bands 71 onto the wheels 70 in the manner well known in the art. Therefore upon operation of either of the levers 74 one or the other of the parts of the jack-shaft will be securely held, which will cause the differential mechanism to drive the pinion 31 connected to the other part of the jack-shaft. This will cause the bull wheel associated with that pinion to rotate while the other bull wheel will be held stationary. Rotation of one of the bull wheels will cause the tractor to be turned on the other bull wheel and about a vertical line passing through the periphery of that bull wheel where it is in contact with the ground. When the tractor is thus to be turned on one of the bull wheels the steering wheel 16 is released, which releases the castor wheel 20 and permits the castor wheel 20 to follow the swing of the forward end of the tractor. The castor wheel thus permits the forward end of the tractor to freely swing about the bull wheel, which would not be the case if the forward end of the tractor was supported by a pair of guide wheels, particularly guide wheels located at an angle for guiding traction purposes, as is commonly used in connection with tractors and conveyances. The guiding means being in the form of a castor and being so constructed that the vertical axis about which the wheel swings is located in advance of the horizontal axis about which the wheel rotates, it readily follows the forward end when turned by the action of the bull wheel. Moreover in the turning operation if the operator sees that the castor wheel will strike a plant he can readily avoid the plant by releasing one of the lever 74 even though the castor wheel is very close to the plant, which will cause both bull wheels to advance the tractor. The castor, by reason of its shape and the relation of the axis of rotation of its frame to the rotation of the wheel, will cause it to immediately swing into a plane parallel to the direction that the tractor is advanced by the operation of both of the bull wheels. When, therefore, the castor has been advanced but a very short distance, such as two or three or six inches, and if the operator sees that the castor wheel will avoid the plant upon further swinging movement of the front end of the tractor, he will again cause the bull wheel, about which the turn is made, to be seized through the operation of one of the levers 74 and cause the castor wheel to cross the row of vegetation. Thus the plant is readily avoided. By the combination of the two guiding means, namely, one through the control of the movement of the bull wheels and the other through the castor wheel, the destruction of vegetation, when turns are made by the tractor, may be entirely obviated.

If it is desired to secure the parts of the jack-shaft together to cause the bull wheels to operate together and prevent differential operations of the bull wheels, this can be done by means of the lever 75 which is pivoted on the frame as at 76, and is provided with the yoke 77. The yoke engages at its ends the hub 78 of one of the friction wheels 70, in the manner well known, and so as to shift it along one of the parts of the jack-shaft and along the key 79 so as to engage and lock with the sleeve 80 which is integral with and forms a part of the hub 81 of the other wheel 70. Thus the two wheels 70 are locked together, which locks the two parts of the jack-shaft 37. If, therefore, one of the bull wheels should run into sand or mud and prevent further forward movement of the tractor by reason of slipping of the bull wheel the two bull wheels may be locked together to cause continued forward movement of the tractor.

If the tractor is to be used for ordinary hauling purposes it may be converted into a general utility tractor by removing the auxiliary shaft 34 and the shell 35 and sliding the bars 25 so as to bring the bull wheels together and placing them in position so that the pinions 31 may act directly upon the gears 30.

I claim:

1. In a tractor, a tractor frame, a pair of bull wheels, and means for adjustably connecting the bull wheels at different distances apart to the tractor frame, a jack shaft for driving the bull wheels, pinions connected to the jack shaft, brackets connected to the frame, extension shafts supported in the brackets and having a clutch for engaging the said pinions, pinions located on the ends of the extension shafts for driving the bull wheels.

2. In a tractor, a driving means, a bull wheel, gear wheels for connecting the bull wheel with the driving means, straps arranged in pairs and located at an angle to the radii of the bull wheel, passing through the ends of the straps, each pair connecting one of the gear wheels and extending from substantially the same point of the gear wheel to the rim of the bull wheel.

3. In a tractor, a driving means, a bull wheel, gear wheels for connecting the bull wheel with the driving means, straps arranged in pairs and located at an angle to the radius of the bull wheel, each pair connecting one of the gear wheels and extending from substantially the same point of the gear wheel to the rim of the bull wheel, the bull wheel having spokes extending from its axle to the ends of the straps connected to the gear wheel.

4. In a tractor, a tractor frame, a pair of bull wheels, slidable adjustable bars connected to the tractor frame and rotatably supporting the bull wheels, a jack shaft for driving the bull wheels, pinions connected to the jack shaft, housings connected to the tractor frame, extension shafts supported in the housings and having heads for fitting the said pinions and pinions located on the ends of the extension shafts for driving the bull wheels.

In testimony whereof, I have hereunto signed my name to this specification.

SAMUEL W. RAYMOND.